United States Patent
Suzuki et al.

(10) Patent No.: US 11,769,102 B2
(45) Date of Patent: Sep. 26, 2023

(54) SERVER, INFORMATION PROCESSING SYSTEM, AND INFORMATION PROCESSING METHOD

(71) Applicants: TOYOTA JIDOSHA KABUSHIKI KAISHA, Toyota (JP); DENSO CORPORATION, Kariya (JP)

(72) Inventors: Yukari Suzuki, Setagaya-ku (JP); Naoki Yamada, Toyota (JP); Toshihiro Arai, Nagoya (JP); Kuniaki Jinnai, Nagoya (JP); Keiichi Uno, Chita-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/943,040

(22) Filed: Jul. 30, 2020

(65) Prior Publication Data
US 2021/0035050 A1    Feb. 4, 2021

(30) Foreign Application Priority Data
Jul. 30, 2019 (JP) ................. 2019-140017

(51) Int. Cl.
*G06Q 10/083* (2023.01)
*G06Q 30/0601* (2023.01)

(52) U.S. Cl.
CPC ....... *G06Q 10/083* (2013.01); *G06Q 30/0633* (2013.01)

(58) Field of Classification Search
CPC .......... G06Q 10/083; G06Q 30/0633
See application file for complete search history.

(56) References Cited

U.S. PATENT DOCUMENTS

2015/0227882 A1* 8/2015 Bhatt ............... G06Q 10/08355
                                                              705/330
2016/0189069 A1* 6/2016 de Montfort Walker ............
                                                              G06Q 10/06312
                                                              705/5

(Continued)

FOREIGN PATENT DOCUMENTS

JP    2002-321828 A    11/2002
JP    2016-170494 A     9/2016

(Continued)

OTHER PUBLICATIONS

Bishop, Todd, "Amazon envisions package pickups on public transit, using lockers on buses, trains and subways," Published by geekwire.com, Aug. 13, 2015, Retrieved from https://www.geekwire.com/2015/amazon-envisions-package-pickups-on-public-transit-using-lockers-on-buses-trains-and-subways/ (Year: 2015).*

(Continued)

*Primary Examiner* — Rupangini Singh
*Assistant Examiner* — Bryan J Kirk
(74) *Attorney, Agent, or Firm* — Oblon, McClelland, Maier & Neustadt, L.L.P.

(57) ABSTRACT

A server according to the present disclosure includes a communication interface for acquiring ordered product information and vehicle information that are input to an input terminal, wherein the ordered product information relates to an article that is ordered by a user, and the vehicle information relates to a vehicle that the user is scheduled to board, and a controller for determining a delivery schedule for delivery of the article indicated by the ordered product information to the vehicle by a date/time when the user will board the vehicle indicated by the vehicle information.

7 Claims, 4 Drawing Sheets

(56) References Cited

U.S. PATENT DOCUMENTS

| | | | | |
|---|---|---|---|---|
| 2017/0236235 A1* | 8/2017 | Frankert | ................ | G06Q 50/30 |
| | | | | 705/13 |
| 2019/0266522 A1* | 8/2019 | Li | ........................... | H04W 4/44 |
| 2019/0318277 A1* | 10/2019 | Goldman | ............. | G05D 1/0088 |
| 2021/0089995 A1* | 3/2021 | Iacono | ................ | G06Q 10/083 |

FOREIGN PATENT DOCUMENTS

| | | |
|---|---|---|
| JP | 2017-514198 A | 6/2017 |
| JP | 2019-16232 A | 1/2019 |
| WO | WO 2015/123224 A1 | 8/2015 |

OTHER PUBLICATIONS

Vehicle News Editorial, "Taxi, What is the Difference Between 'Pick Up' and 'Reservation'? What Does 'Come in 10 Minutes' Mean?" Mediavague Co., Ltd., URL:https://trafficnews.jp/post/79320, Dec. 28. 2017. (w/ English Translation).

\* cited by examiner

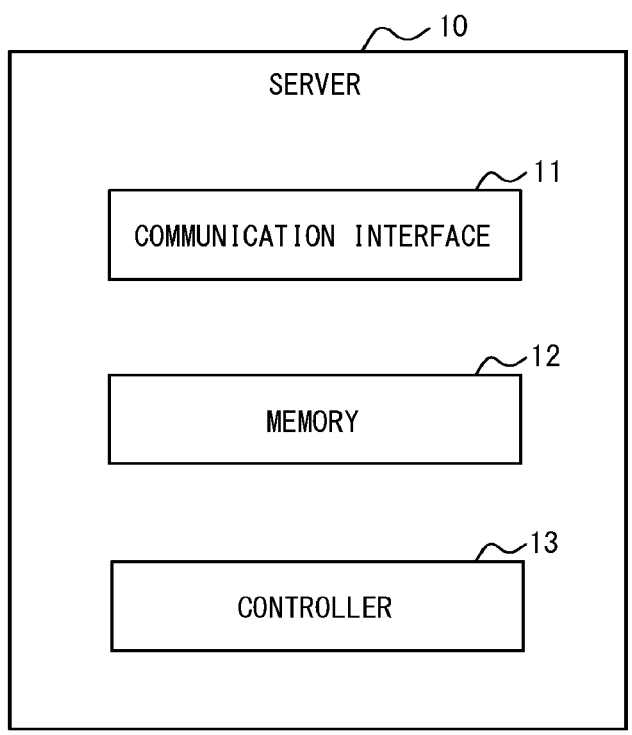

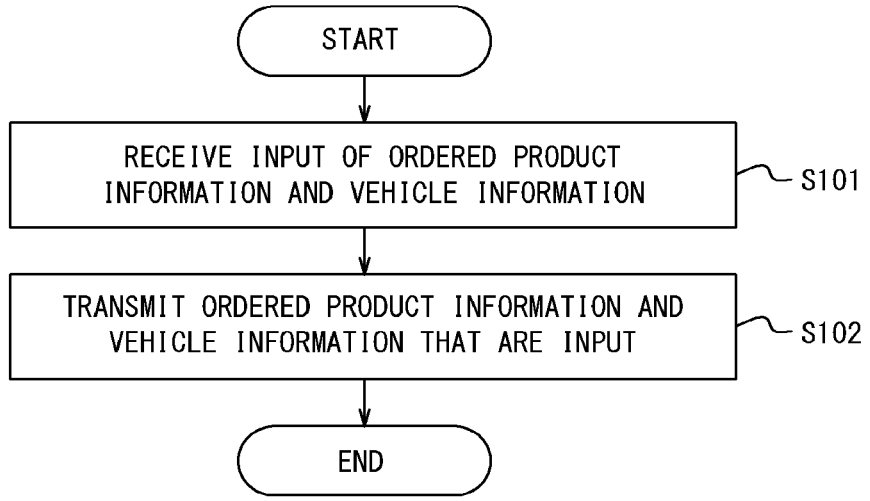
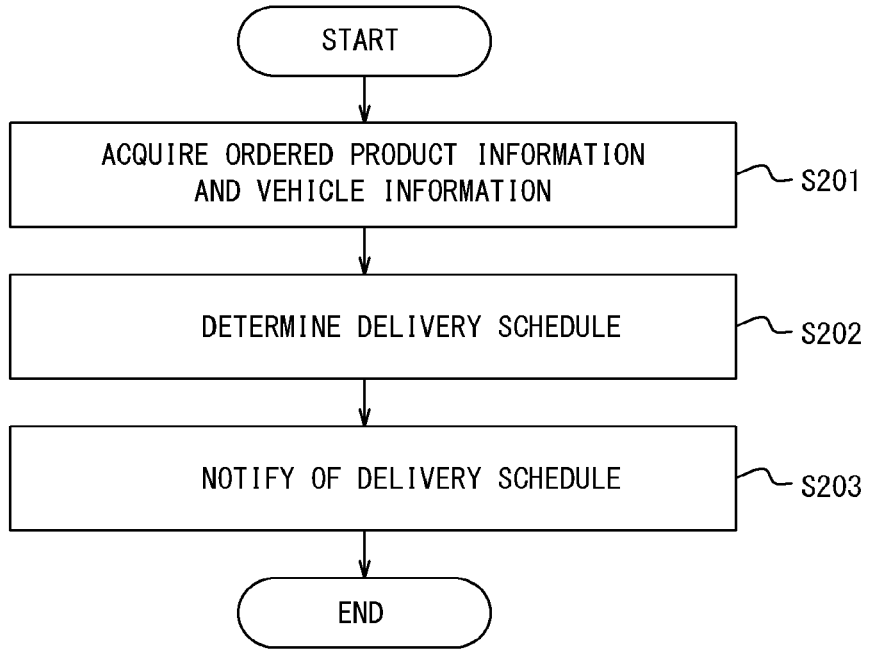

SERVER, INFORMATION PROCESSING SYSTEM, AND INFORMATION PROCESSING METHOD

CROSS-REFERENCE TO RELATED APPLICATION

The present application claims priority to Japanese Patent Application No. 2019-140017 filed on Jul. 30, 2019, the entire contents of which are incorporated herein by reference.

TECHNICAL FIELD

The present disclosure relates to a server, an information processing system, and an information processing method.

BACKGROUND

As an example, JP 2016-170494 A (PTL 1) discloses a technology for acquiring position information for a person who ordered a product (an ordering person) through a mobile terminal, calculating, on the basis of the acquired position information, the movement time required for the ordering person to move to a collection location for the product, and transmitting, on the basis of the calculated movement time and a product preparation time required for preparation of the ordered product, a product collection guide to the mobile terminal of the ordering person.

CITATION LIST

Patent Literature

PTL 1: JP 2016-170494 A

SUMMARY

Services for delivery of products (articles) ordered by a user on a website to a location specified by the user, such as the home of the user, are widely used. With such services, a user cannot collect an ordered product in a case in which the user is not present at a delivery location at the time of delivery of the product.

The technology described in PTL 1 is a technology enables a user to avoid a long wait for collection of an ordered article at a shop or the like where the article that the user ordered is being sold, and does not give sufficient consideration to reliable collection of the ordered article. Furthermore, with the technology described in PTL 1, it is necessary for the user to go to the shop or the like where the ordered product is being sold, which is not convenient for collection of the article.

An object of the present disclosure made in view of the problems as described above is to provide a server, an information processing system, and an information processing method which enable more reliable collection of an ordered article while ensuring convenience.

A server according to an aspect of the present disclosure includes:
 an acquisition interface for acquiring ordered product information and vehicle information that are input to an input terminal, wherein the ordered product information relates to an article that is ordered by a user, and the vehicle information relates to a first vehicle that the user is scheduled to board; and
 a controller for determining a delivery schedule for delivery of the article indicated by the ordered product information to the first vehicle by a date/time when the user will board the first vehicle indicated by the vehicle information.

An information processing system according to an aspect of the present disclosure includes:
 an input terminal for receiving input from a user; and
 a server that is capable of communicating with the input terminal, where
 the input terminal is configured to receive input of ordered product information and vehicle information, wherein the ordered product information relates to an article that is ordered by the user, and the vehicle information relates to a first vehicle that the user is scheduled to board, and
 the server is configured to:
  acquire the ordered product information and the vehicle information that are input to the input terminal, and
  determine a delivery schedule for delivery of the article indicated by the ordered product information to the first vehicle by a date/time when the user will board the first vehicle indicated by the vehicle information.

An information processing method according to an aspect of the present disclosure is an information processing method of a server that is capable of communicating with an input terminal that receives input from a user, the method including:
 acquiring ordered product information and vehicle information that are input to the input terminal, wherein the ordered product information relates to an article that is ordered by the user, and the vehicle information relates to a first vehicle that the user is scheduled to board; and
 determining a delivery schedule for delivery of the article indicated by the ordered product information to the first vehicle by a date/time when the user will board the first vehicle indicated by the vehicle information.

According to aspects of the present disclosure, more reliable collection of an ordered article is enabled, while ensuring convenience.

BRIEF DESCRIPTION OF THE DRAWINGS

In the accompanying drawings:

FIG. 2 is a diagram illustrating an example configuration of a server illustrated in FIG. 1;

FIG. 3 is a flowchart illustrating example operation of an input terminal illustrated in FIG. 1;

FIG. 4 is a flowchart illustrating example operation of the server illustrated in FIG. 1.

DETAILED DESCRIPTION

Figure 1:
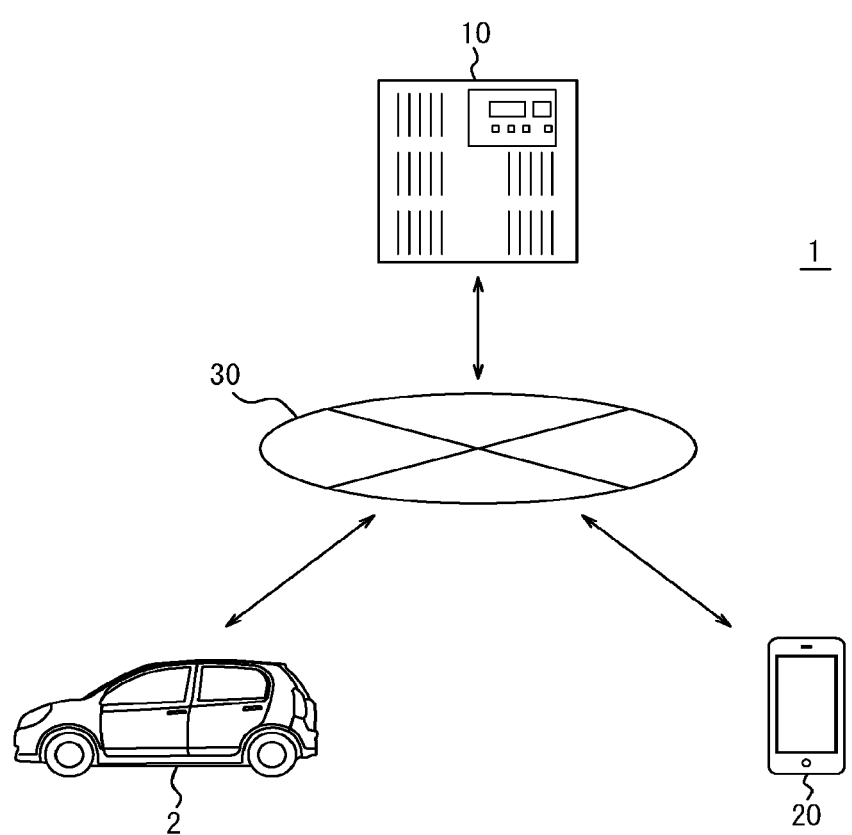
FIG. 1 is a diagram illustrating an example configuration of an information processing system according to an embodiment of the present disclosure.

Hereinafter, an embodiment of the present disclosure will be described with reference to the drawings. In the drawings, the same reference signs are used to indicate same or equivalent constitutive elements.

FIG. 1 is a diagram illustrating an example configuration of an information processing system 1 according to an embodiment of the present disclosure. The information processing system 1 according to the present embodiment is for delivering an article (product) ordered by a user to a vehicle 2 that the user is to board, such that the article can be collected at the vehicle 2.

The information processing system 1 according to the present embodiment includes a server 10 and an input terminal 20. The server 10 and the input terminal 20 are communicably connected to a network 30, which may include a mobile communication network, the Internet and the like, for example. The server 10 includes one or a plurality of server apparatuses. For example, the input terminal 20 may be, but is not limited to, a smartphone, a smart speaker, a personal computer (PC) or the like, and may be any apparatus that is used by a user.

First, an outline of the present embodiment will be described, with details given later. The input terminal 20 receives input of ordered product information regarding an article that is ordered by a user, and vehicle information regarding a vehicle 2 (first vehicle) that the user is scheduled to board. The server 10 acquires the ordered product information and the vehicle information input to the input terminal 20, and determines a delivery schedule for delivering the article indicated by the ordered product information to the vehicle 2 by a date/time when the user will board the vehicle 2 indicated by the vehicle information.

According to such a configuration, it is not necessary for the user to go to a shop or the like to collect the article that the user ordered, and instead may collect the ordered article when on board the vehicle 2 that the user is scheduled to board. More reliable collection of an ordered article is thus enabled, while ensuring convenience.

Next, each element of the information processing system 1 will be described in detail.

First, a description of the vehicle 2 will be given.

The vehicle 2 is, for example, a vehicle that operates as a so-called on-demand bus that operates according to requests from users regarding boarding time, boarding location and the like. The vehicle 2 allows passengers to board, and can also be loaded with articles ordered by users.

The vehicle 2 may include an autonomous driving function for automatically performing vehicle control on the basis of control information from an external source. In the present embodiment, "autonomous driving" includes automation of some or all of the user operations for driving a vehicle. For example, autonomous driving may encompass levels 1 to 5 defined by the Society of Automotive Engineers (SAE). Furthermore, the vehicle 2 may include an on-board communication device, and may be connected to the network 30 by the on-board communication device in the manner illustrated in FIG. 1. At least a part of an application programming interface (API) defining the specifications for control information is disclosed to a service provider that provides services using vehicles which include the autonomous driving function. The service provider can freely program autonomous driving control software using the disclosed API. Accordingly, the service provider may provide any mobility service (such as a product delivery service using the vehicle 2) by installing facilities, in accordance with a given purpose, in a cabin space of the vehicle which includes the autonomous driving function and by programming autonomous driving control software using the API in accordance with the given purpose. In cases in which the vehicle 2 includes the autonomous driving function, the vehicle 2 may receive the delivery schedule determined by the server 10, and perform autonomous driving on the basis of the received delivery schedule.

As described above, the input terminal 20 receives input of the ordered product information regarding an article that is ordered by a user and the vehicle information regarding the vehicle 2 that the user is scheduled to board, and transmits the information to the server 10. The input terminal 20 may be configured in any providing that it includes functionality for performing communication via the network 30, functionality for receiving input from a user, functionality for displaying various pieces of information, and the like. The configuration of an input terminal 20 having such functionality is well known, and a description thereof is therefore omitted.

Next, a configuration of the server 10 will be described.

FIG. 2 is a diagram illustrating an example configuration of the server 10 according to the present embodiment.

The server 10 illustrated in FIG. 2 includes a communication interface 11, a memory 12, and a controller 13. The communication interface 11 is an example of an acquisition interface.

The communication interface 11 includes one or more communication modules that are connected to the network 30. For example, the communication modules may be compatible with mobile communication standards such as 4th Generation (4G) and 5th Generation (5G) standards, wired local area network (LAN) standards, or wireless LAN standards, but the communication modules may be compatible with any communication standards without being limited to the above. In the present embodiment, the server 10 is connected to the network 30 via the communication interface 11. The communication interface 11 receives (acquires) the ordered product information and the vehicle information that are transmitted from the input terminal 20 via the network 30.

For example, the memory 12 may be, but is not limited to, a main memory, an auxiliary memory, or a cache memory. The memory 12 stores any information that is used in operation of the server 10. For example, the memory 12 may store a system program, an application program, a database, and the like. Information that is stored in the memory 12 may be updated by information that is acquired from the network 30 via the communication interface 11, for example.

The controller 13 includes one or more processors. In the present embodiment, the "processor" may be, but is not limited to, a general-purpose processor or a dedicated processor dedicated to specific processing. The controller 13 controls operation of the entire server 10. Details of the operation of the server 10 that is controlled by the controller 13 will be given later.

Next, operation of the server 10 and the input terminal 20 will be described. First, operation of the input terminal 20 will be described.

FIG. 3 is a flowchart illustrating example operation of the input terminal 20.

The input terminal 20 receives input, from a user, of the ordered product information regarding an article that is ordered by the user, and the vehicle information regarding the vehicle 2 (first vehicle) that the user is scheduled to board (step S101). The ordered product information and the vehicle information may be input, for example, by starting an application, installed in the input terminal 20, used to order an article and to request delivery (hereinafter referred to as "order/delivery request application"). When the order/delivery request application is started, the input terminal 20 displays an input screen to be used for input of the ordered product information and the vehicle information. The input terminal 20 receives input of the ordered product information and the vehicle information on the basis of input of the user by the input screen. Additionally, the input terminal 20 may further receive, as the vehicle information, information regarding a date/time when the user is scheduled to board the vehicle 2.

When input of the ordered product information and the vehicle information is received, the input terminal 20 transmits the ordered product information and the vehicle information that have been input, to the server 10 via the network 30 (step S102).

Next, operation of the server 10 will be described. FIG. 4 is a diagram for describing an information processing method of the server 10 according to the present embodiment, and is a flowchart illustrating example operation of the server 10.

The communication interface 11 receives (acquires) the ordered product information and the vehicle information that are transmitted from the input terminal 20 via the network 30 (step S201).

The controller 13 determines a delivery schedule on the basis of the ordered product information and the vehicle information that have been acquired by the communication interface 11 (step S202). Specifically, the controller 13 determines a delivery schedule according to which the article indicated by the ordered product information is delivered to the vehicle 2 indicated by the vehicle information by the date/time when the user will board the vehicle 2.

The controller 13 may determine the delivery schedule for an operator that handles the article that is indicated by the ordered product information. That is, the controller 13 may determine the delivery schedule according to which the article indicated by the ordered product information is delivered to the vehicle 2, by the operator handling the article, by the date/time when the user will board the vehicle 2. Furthermore, the controller 13 may determine the delivery schedule for the vehicle 2. That is, the controller 13 may determine a delivery schedule according to which the vehicle 2 travels to the operator handling the article indicated by the ordered product information to collect the article by the date/time when the user will board the vehicle 2.

Next, the controller 13 notifies a predetermined notification destination of the determined delivery schedule (step S203). Specifically, in cases in which the delivery schedule is determined for the operator handling the article indicated by the ordered product information, the controller 13 notifies the operator of the determined delivery schedule. Furthermore, in a case where the delivery schedule is determined for the vehicle 2, the controller 13 notifies the vehicle 2 of the determined delivery schedule. In a case where the vehicle 2 includes the autonomous driving function, the vehicle 2 may perform autonomous driving according to the delivery schedule that is notified, and travel to the operator handling the article indicated by the ordered product information to collect the article indicated by the ordered product information.

At the time of determining the delivery schedule, if the time until the date/time when the user will board the vehicle 2 is shorter than a predetermined length of time (such as a time required to prepare the ordered product and to deliver the product to the vehicle 2), the controller 13 may cease determination of the delivery schedule. In this case, because it is difficult to deliver the ordered product to the vehicle 2 indicated by the vehicle information input by the user before the boards, the controller 13 may request the user, via the input terminal 20, to input the vehicle information of a vehicle 2 that the user is scheduled to board after the vehicle 2 that is indicated by the previously input vehicle information, for example.

Additionally, for example, in the case where information regarding the date/time when the user gets on the vehicle 2 is included in the vehicle information, the controller 13 can identify the date/time when the user gets on the vehicle 2 that is indicated by the vehicle information, on the basis of the information regarding the date/time. Furthermore, in the case where an operation schedule of the vehicle 2 from a departure point to a destination point is known, the controller 13 may identify the date/time when the user gets on the vehicle 2 indicated by the vehicle information, on the basis of the operation schedule.

Figure 5:
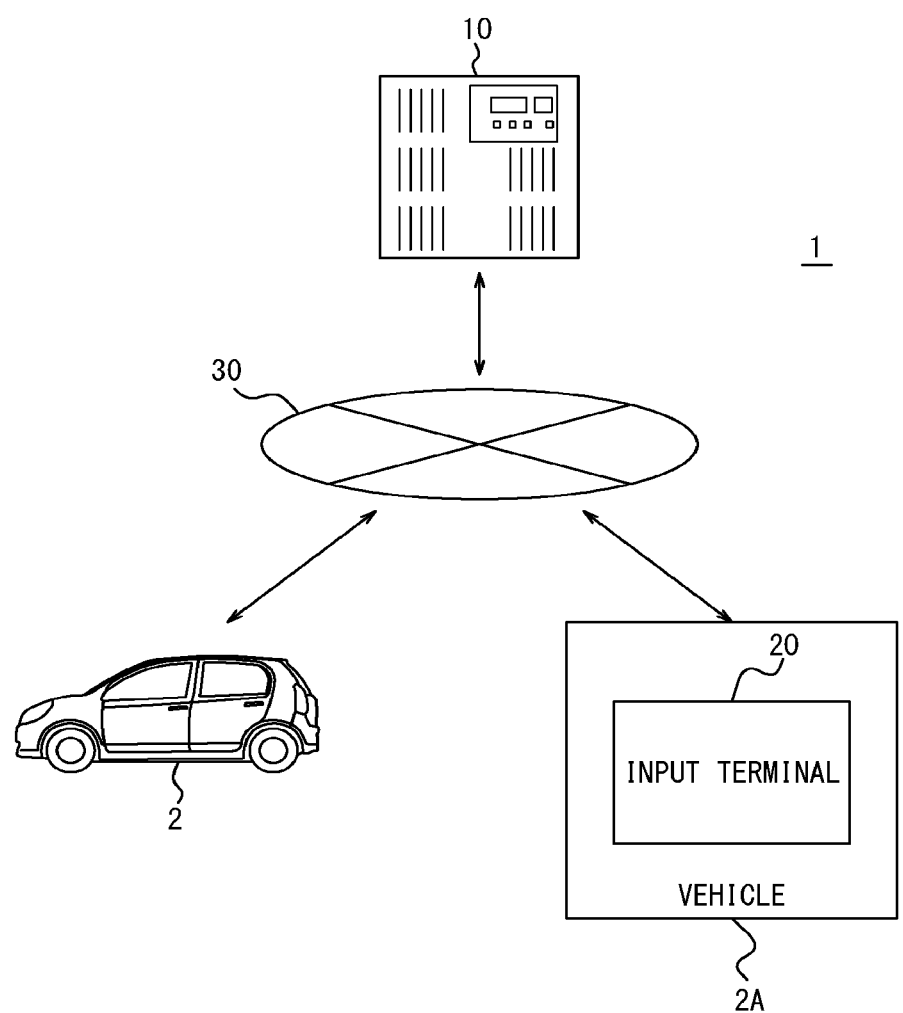
FIG. 5 is a diagram illustrating another example configuration of the information processing system according to the embodiment of the present disclosure.

The present embodiment describes a case in which the input terminal 20 is a general terminal apparatus that is used by a user, such as a smartphone, a smart speaker, a PC or the like, but the present disclosure is not limited to such a case. The input terminal 20 may be a vehicle-mounted terminal that is mounted in a vehicle 2A, as illustrated in FIG. 5. In this case, the input terminal 20 communicates with the server 10 via the network 30 using an on-board communication device mounted in the vehicle 2A.

For example, like the vehicle 2, the vehicle 2A may be a vehicle such as an on-demand bus that includes the autonomous driving function. The vehicle 2A is a vehicle (second vehicle) that the user will board before boarding the vehicle 2 (first vehicle). For example, in a case in which the user travels to/from work using the vehicles 2, 2A that are on-demand buses, the vehicle 2A may be a vehicle that the user boards at the time of traveling to work, and the vehicle 2 may be a vehicle that the user boards at the time of returning home. In this case, if the user inputs, when on board the vehicle 2A to travel to work, the ordered product information and the vehicle information regarding the vehicle 2 that the user is to board when returning home, using the input terminal 20 mounted in the vehicle 2A, the ordered article is delivered to the vehicle 2 in time for the boarding time of the user to the vehicle 2, and the ordered article may be collected in the vehicle 2 at the time that the user is returning home.

As described above, in the information processing system 1 according to the present embodiment, the input terminal 20 receives input of the ordered production information regarding an article that is ordered by a user, and the vehicle information regarding the vehicle 2 (first vehicle) that the user is scheduled to board. The server 10 acquires the ordered product information and the vehicle information that are input to the input terminal 20, and determines a delivery schedule for delivering the article indicated by the ordered product information to the vehicle 2 by a date/time when the user will board the vehicle 2 indicated by the vehicle information.

According to such a configuration, it is not necessary for the user to go to a shop or the like to collect the article that the user ordered, but may collect the ordered article when the user is on the vehicle 2 that the user is scheduled to board. Thus, more reliable collection of the ordered article is enabled, whilst ensuring convenience.

The embodiment described above is given as a typical example, but those skilled in the art will readily recognize that many modifications and substitutions may be made within the spirit and scope of the present disclosure. Accordingly, the present disclosure should not be interpreted as being limited to the embodiment described above, and various alterations and modifications may be made without departing from the scope of the claims. For example, a plurality of structural blocks illustrated in a configuration diagram of the embodiment may be combined into one, or one structural block may be divided into several blocks.

Furthermore, for example, one or more general-purpose information processing apparatuses, such as a smartphone or a computer, may be caused to function as the server 10 according to the embodiment described above. Specifically, a program describing processing instructions for implementing each function of the server 10 according to the embodiment is stored in a memory of the information processing apparatus, and a processor of the information processing apparatus reads out and executes the program. Accordingly, the disclosure of the present embodiment may be implemented as a program that is executable by a processor, or may also implement a non-transitory computer-readable recording medium recording such a program.

Furthermore, in addition to the example given above, the network 30 according to the present embodiment may be one or a combination of an ad hoc network, a metropolitan area network (MAN), a cellular network, a wireless personal area network (WPAN), a public switched telephone network (PSTN), a terrestrial wireless network, an optical network, or another network. Structural elements of a wireless network include an access point (such as a Wi-Fi access point), a femtocell, and the like, for example. Moreover, a wireless communication appliance may be connected to a wireless network that uses Wi-Fi® (Wi-Fi is a registered trademark in Japan, other countries, or both), Bluetooth® (Bluetooth is a registered trademark in Japan, other countries, or both), a cellular communication technology, or other wireless technologies and technology standards.

As described above, various aspects of the present disclosure may be embodied in various different modes, and the modes are all included in the scope of the present embodiment.

The invention claimed is:

1. An information processing system comprising:
   a first vehicle having an autonomous driving function; and
   a server comprising:
      a wired or wireless communication interface configured to receive ordered product information and vehicle information that are input to an input terminal by a user when the user is on board a second vehicle to travel from a first location to a second location, the ordered product information indicating an article that is ordered by the user, and the vehicle information indicating a boarding time at which the user is scheduled to board the first vehicle to return to the first location; and
      a processor configured to
         determine a delivery schedule according to which the first vehicle travels to an operator handling the article, collects the article, travels to the second location with the article loaded therein by the boarding time, based on the ordered product information and the vehicle information that are received by the wired or wireless communication interface,
         compare a time length between a current time and the boarding time to a predetermined length of time, and
         when the time length is greater than or equal to the predetermined length of time, transmit the delivery schedule to the first vehicle,
   wherein when the first vehicle receives the delivery schedule from the server when the time length is greater than or equal to the predetermined length of time, the first vehicle is programmed via an application programming interface to perform autonomous driving based on the received delivery schedule, and the first vehicle performs the autonomous driving that is programmed via the application programming interface, the autonomous driving including traveling to the operator, collecting the article, traveling to the second location with the article loaded therein by the boarding time, and allowing the user to board the first vehicle and collect the article therein, and
   wherein when the time length is less than the predetermined length of time, the processor of the server is configured to, instead of transmitting the delivery schedule to the first vehicle, request the user via the input terminal to input new vehicle information regarding a third vehicle that the user is scheduled to board after boarding the first vehicle.

2. The information processing system according to claim 1, wherein
   the input terminal is a vehicle-mounted terminal that is mounted in the second vehicle, and
   the wired or wireless communication interface is configured to receive the ordered product information and the vehicle information that are input via the vehicle-mounted terminal.

3. The information processing system according to claim 1, wherein the first vehicle is configured to operate according to a request from the user regarding the boarding time.

4. The information processing system according to claim 1, further comprising the input terminal.

5. An autonomous driving and information processing method of a first vehicle having an autonomous driving function and a server that is capable of communicating with an input terminal that receives input from a user, the autonomous driving and information processing method comprising:
   receiving, by the server, ordered product information and vehicle information that are input to the input terminal when the user is on board a second vehicle to travel from a first location to a second location, the ordered product information indicating an article that is ordered by the user, and the vehicle information indicating a boarding time at which the user is scheduled to board the first vehicle to return to the first location;
   determining, by the server, a delivery schedule according to which the first vehicle travels to an operator handling the article, collects the article, travels to the second location with the article loaded therein by the boarding time, based on the ordered product information and the vehicle information that are received by the server;
   comparing, by the server, a time length between a current time and the boarding time to a predetermined length of time;
   when the time length is greater than or equal to the predetermined length of time,
      transmitting, from the server, the delivery schedule to the first vehicle,
      receiving, by the first vehicle, the delivery schedule from the server,
      programming, by the first vehicle, autonomous driving to be performed by the first vehicle based on the received delivery schedule via an application programming interface, and
      performing, by the first vehicle, the autonomous driving programmed via the application programming interface, the autonomous driving performed by the first vehicle including traveling to the operator, collecting the article, traveling to the second location with the article loaded therein by the boarding time, and allowing the user to board the first vehicle and collect the article therein; and when the time length is less than the predetermined length of time, instead of transmitting the delivery schedule to the first vehicle, requesting, by the server, the user via the input terminal to input new vehicle information regarding a third vehicle that the user is scheduled to board after boarding the first vehicle.

6. The information processing system according to claim 1, wherein the processor is further configured to notify the operator of the delivery schedule.

7. The method according to claim 5, further comprising notifying the operator of the delivery schedule.

* * * * *